US010341320B2

(12) United States Patent
Hanay et al.

(10) Patent No.: US 10,341,320 B2
(45) Date of Patent: Jul. 2, 2019

(54) BYOD CREDENTIAL MANAGEMENT

(71) Applicant: Aerohive Networks, Inc., Milpitas, CA (US)

(72) Inventors: John William Hanay, Palo Alto, CA (US); Michael Isamu Lee, San Jose, CA (US); Ngan My Bich Huynh, Campbell, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 203 days.

(21) Appl. No.: 15/053,298

(22) Filed: Feb. 25, 2016

(65) Prior Publication Data

US 2017/0208054 A1 Jul. 20, 2017

Related U.S. Application Data

(60) Provisional application No. 62/280,240, filed on Jan. 19, 2016.

(51) Int. Cl.
*H04L 29/06* (2006.01)

(52) U.S. Cl.
CPC .............. *H04L 63/08* (2013.01); *H04L 63/06* (2013.01); *H04L 63/10* (2013.01)

(58) Field of Classification Search
CPC .......... H04L 9/10; H04L 63/101; G06F 21/41
USPC ................... 726/1–5; 713/130–132; 455/411
See application file for complete search history.

(56) References Cited

U.S. PATENT DOCUMENTS

| 9,621,540 | B2 * | 4/2017 | Almahallawy | ....... H04L 63/062 |
| 9,705,916 | B2 * | 7/2017 | Ben-Shalom | ......... H04L 63/164 |
| 2005/0055570 | A1 | 3/2005 | Kwan | |
| 2005/0262164 | A1 | 11/2005 | Guiheneuf | |
| 2010/0043061 | A1 | 2/2010 | Martin | |
| 2012/0167185 | A1 * | 6/2012 | Menezes | ............... H04L 9/3213 726/5 |
| 2013/0007848 | A1 * | 1/2013 | Chaskar | ............... H04W 12/12 726/4 |
| 2013/0166910 | A1 | 6/2013 | Wilkinson | |

(Continued)

OTHER PUBLICATIONS

International Application No. PCT/US2017/037539, International Search Report and Written Opinion dated Sep. 22, 2017.

(Continued)

*Primary Examiner* — Lynn D Feild
*Assistant Examiner* — Viral S Lakhia
(74) *Attorney, Agent, or Firm* — Sheppard, Mullin, Richter & Hampton LLP

(57) ABSTRACT

An identity platform system configured to authenticate a company-assigned device for accessing a first network using a first unique pre-shared key associated with the company-assigned device. A personal BYOD credential management system configured to authenticate a personal BYOD for accessing a second network using a second unique pre-shared key associated with the personal BYOD. A network administrator interface configured to provide access to the identity platform for a network administrator. A personal BYOD credential management system API included as part of the identity platform system and configured to provide the identity platform system access to the personal BYOD credential management system as if the personal BYOD credential management system is embedded in the identity platform system.

24 Claims, 7 Drawing Sheets

(56) References Cited

U.S. PATENT DOCUMENTS

| | | | |
|---|---|---|---|
| 2013/0346302 A1 | 12/2013 | Purves | |
| 2014/0173692 A1* | 6/2014 | Srinivasan | H04W 12/02 726/4 |
| 2014/0223533 A1 | 8/2014 | Vitali | |
| 2014/0259094 A1* | 9/2014 | Narayanaswamy | H04L 67/20 726/1 |
| 2014/0282902 A1 | 9/2014 | Zou | |
| 2014/0282951 A1 | 9/2014 | Ranade | |
| 2014/0298420 A1* | 10/2014 | Barton | H04L 63/10 726/4 |
| 2014/0304808 A1* | 10/2014 | Martini | G06F 21/44 726/19 |
| 2014/0349611 A1* | 11/2014 | Kant | H04W 8/18 455/411 |
| 2015/0033298 A1* | 1/2015 | Martini | G06F 21/44 726/5 |
| 2015/0082025 A1 | 3/2015 | Deshpande | |
| 2015/0106892 A1* | 4/2015 | Hauw | H04L 63/067 726/6 |
| 2015/0111534 A1* | 4/2015 | Grayson | H04M 3/4931 455/411 |
| 2015/0222637 A1* | 8/2015 | Hung | G06F 21/53 726/1 |
| 2016/0012465 A1 | 1/2016 | Sharp | |
| 2016/0026776 A1 | 1/2016 | Hurst | |
| 2016/0080343 A1* | 3/2016 | Robinton | H04W 4/008 726/4 |
| 2016/0127352 A1* | 5/2016 | Xu | H04L 63/0815 726/8 |
| 2016/0164722 A1 | 6/2016 | Zhu | |
| 2016/0212695 A1* | 7/2016 | Lynch | H04W 48/08 |
| 2016/0330079 A1* | 11/2016 | Laos | H04L 41/12 |
| 2016/0366183 A1 | 12/2016 | Smith | |
| 2017/0034160 A1* | 2/2017 | Brands | H04L 63/0861 |
| 2017/0041296 A1 | 2/2017 | Ford | |
| 2017/0054571 A1 | 2/2017 | Kitchen | |
| 2017/0094509 A1* | 3/2017 | Mistry | H04L 63/083 |
| 2017/0149784 A1* | 5/2017 | White, Jr. | H04L 63/0209 |

OTHER PUBLICATIONS

ExtendOffice.com, "How to Send Meeting Update to One (New) Attendee Only in Outlook?," Jan. 2014 [retrieved online at https://www.extendoffice.com/documents/outlook/2078-outlook-send-meeting-updates-to-one-person.html on Aug. 2, 2018].

Liu, Ya-Nan et al., "Key Sharing in Hierarchical Wireless Sensor Networks," 2010 IEEE/IFIP International Conference on Embedded and Ubiquitous Computing, pp. 743-748, Dec. 11, 2010.

* cited by examiner

BYOD CREDENTIAL MANAGEMENT

CROSS REFERENCE TO RELATED APPLICATIONS

This application claims priority to U.S. Provisional Application No. 62/280,240 filed on Jan. 19, 2016, which is incorporated herein by reference.

BACKGROUND

An area of ongoing research and development is credential management. In particular, there exists a need for control over personal bring your own device ("BYOD") credential management.

The foregoing examples of the related art and limitations related therewith are intended to be illustrative and not exclusive. Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

In various implementations, an identity platform system is provided for managing access to a network for corporate-assigned devices. Further, in various implementations, a personal BYOD credential management system is provided for managing access to a network for personal BYODs. In various implementations, the identity platform system includes a personal BYOD credential management system API through which the personal BYOD credential management system can be accessed.

These and other advantages will become apparent to those skilled in the relevant art upon a reading of the following descriptions and a study of the several examples of the drawings.

DETAILED DESCRIPTION

Figure 1:
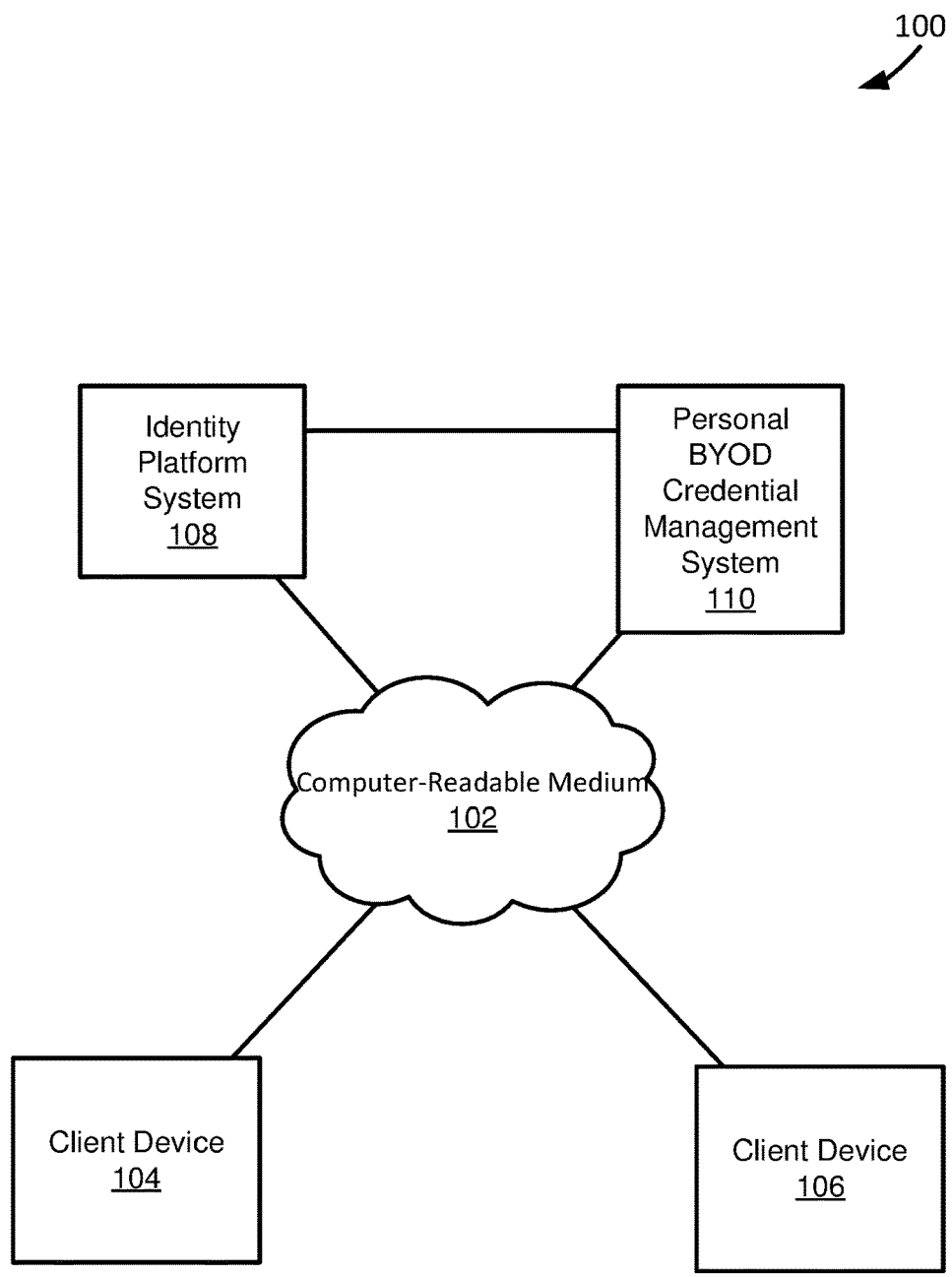
FIG. 1 depicts a diagram of a system for providing network credentials to a meeting attendee.

FIG. 1 depicts a diagram 100 of a system for providing network credentials to a meeting attendee. The example system shown in FIG. 1 includes a computer-readable medium 102, a first client device 104, a second client device 106, an identity platform system 108, and a personal bring your own device ("BYOD") credential management system 110.

In the example system shown in FIG. 1, the first client device 104, the second client device 106, the identity platform system 108, and the personal BYOD credential management system 110 are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the first client device 104, the second client device 106, the identity platform system 108, the personal BYOD credential management system 110, and other applicable systems or devices described in this paper can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, Ethernet interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The first client device 104 functions according to an applicable device for sending and receiving data through a network. In various implementations, the first client device 104 can include a communication engine configured to use a key for authenticating the first client device 104 for communicating with a network. Depending upon implementation-specific or other considerations, the first client device 104 uses a unique pre-shared key for authenticating for a network. As used in this paper a unique pre-shared key is a private key used for authenticating a client device for a network uniquely associated with the client device or a plurality of client devices including the client device. For example, MAC addresses of a client device or a plurality of client devices can be bound to a unique pre-shared key to associate the client device or the plurality of client devices with the unique pre-shared key. The first client device 104 can be a corporate-assigned device of a corporation associated with a network accessed by the first client device 104 or a personal bring your own device (hereinafter referred to as "BYOD"). A corporate-assigned device is a device assigned to an employee by an entity, that can be owned by the entity. For example the first client device 104 can be a laptop issued to an employee by a corporation. In another example, the first client device 104 can be a personal laptop that an employee brings on premises of a corporation to access a network of the corporation.

The second client device 106 functions according to an applicable device for sending and receiving data through a network. In various implementations, the second client device 106 can include a communication engine configured to use a key for authenticating the second client device 106 for communicating with a network. Depending upon implementation-specific or other considerations, the second client device 106 uses a unique pre-shared key for authenticating for a network. The second client device 106 can be a corporate-assigned device of a corporation associated with a network accessed by the second client device 106 or a personal bring your own device (hereinafter referred to as "BYOD"). For example the second client device 106 can be a laptop issued to an employee by a corporation. In another example, the second client device 106 can be a personal laptop that an employee brings on premises of a corporation to access a network of the corporation. Depending upon implementation-specific or other considerations, the first client device 104 is a corporate-assigned device of an employee, and the second client device 106 is a BYOD of the same employee. For example, the first client device 104 can be a laptop assigned to an employee by a corporation, and the second client device 106 can be a personal laptop of the employee.

In a specific implementation, either or both the first client device 104 and the second client device 106 act as or include a station, by including a wireless interface through which they can be coupled through a Wi-Fi connection to a network device. A station, as used in this paper, can be referred to as a device with a media access control (MAC) address and a physical layer (PHY) interface to a wireless medium that complies with the IEEE 802.11 standard. Thus, for example, the first client device 104 and the second client device 106 can be referred to as stations, if applicable. IEEE 802.11a-1999, IEEE 802.11b-1999, IEEE 802.11g-2003, IEEE 802.11-2007, IEEE 802.11n TGn Draft 8.0 (2009), and IEEE 802.11ac-2013 are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the first client device 104 and the second client device 106 are wirelessly coupled to a network or a plurality of networks through one or a plurality of network devices. In various embodiments, the first client device 104 can be coupled to a first network while the second client device is coupled to a second network different from the first network or a subset of the first network. Network devices function according to applicable devices for routing, at least in part, data traffic to and from a backend of a network. Depending upon implementation-specific or other considerations, network devices can be routers, switches, access points, gateways, including wireless gateways, repeaters, or any combinations thereof. In functioning as gateways, network devices can transport data from a backend of a network to a device coupled to the network devices. In functioning as access points, network devices can couple a device coupled to the network devices to a network associated with the network devices. Network devices can function according to applicable protocols for forming part of a wireless network, including WiFi, such as the IEEE 802.11 standards, which are hereby incorporated by reference.

The identity platform system 108 functions to manage credentials of corporate-assigned devices for accessing a wireless network, thereby serving as an active directory. In managing credentials associated with various corporate-assigned devices, the identity platform system 108 can generate and/or update corporate device data indicating corporate-assigned device credentials for authenticating corporate-assigned devices. Corporate device data can include identifications of corporate-assigned devices, unique pre-shared keys associated with corporate-assigned devices, and users to whom the corporate-assigned devices have been assigned. Depending upon implementation-specific or other considerations, the identity platform system 108 can associate and disassociate unique pre-shared keys with corporate-assigned devices. For example, if an employee leaves a company, then the identity platform system 108 can disassociate a unique pre-shared key associated with a corporate-assigned device given to the employee. Further in the example, if the corporate-assigned device is given to another employee, the identity platform system 108 can associated another unique pre-shared key with the corporate-assigned device. Further depending upon implementation-specific or other considerations, the identity platform system 108 can disassociate and associate different users with corporate-assigned devices. For example, if an employee leaves a company, then the identity platform system 108 can disassociate the employee from a corporate-assigned device given to the employee and associated an new employee with the device. In various implementations, the identity platform system 108 manages credentials of corporate-assigned devices according to input from a network administrator.

In a specific implementation, the identity platform system 108 manages authentication of corporate-assigned devices for accessing a network. In various implementations, the identity platform system 108 can authenticate a corporate-assigned device for accessing a network using a unique pre-shared key. For example, the identity platform system 108 can receive authentication data from a corporate-assigned device generated using a unique pre-shared key and determine from the authentication data whether it was generated using a unique pre-shared key uniquely associated with the corporate-assigned device. The identity platform system 108 can be implemented as part of a network device or implemented as a cloud based system accessible by the network device.

In a specific implementation, the identity platform system 108 functions to onboard a corporate-assigned device for accessing a network as part of managing credentials for accessing a wireless network. In onboarding a corporate-assigned device, the identity platform system 108 can assign a unique pre-shared key to the device for authenticating the device for a network. For example, once a corporate-assigned device is assigned to an employee, the identity platform system 108 can associate a unique pre-shared key to the device, for use in authenticating the device for a network. Further in the example, the identity platform system 108 can send the unique pre-shared key assigned to the device for future use in authenticating the device for the network.

In a specific implementation, the identity platform system 108 includes a network administrator interface. A network administrator interface functions according to an applicable interface through which a network administrator can communicate with the identity platform system 108. Depending upon implementation-specific or other considerations, through a network administrator interface a network administrator can view how the identity platform system 108 is managing credentials for corporate-assigned devices. For example, using a network administrator interface, a network administrator can see which employees have been assigned specific corporate-assigned devices and which unique pre-shared keys have been bound to specific corporate-assigned devices. Further depending upon implementation-specific or other considerations, through a network administrator interface, a network administrator can provide instructions to the identity platform system 108. For example, if an employee has left a company, a network administrator can instruct the identity platform system 108 to disassociate the employee from a corporate-assigned device given to the employee.

In a specific implementation, the identity platform system 108 includes a personal BYOD credential management system application program interface (hereinafter referred to as "API"). A personal BYOD credential management system API can be used by the identity platform system 108 for accessing an applicable system for managing personal BYOD credentials. In various implementations, through a personal BYOD credential management system API, an applicable system for managing personal BYOD credentials becomes embedded in the identity platform system 108. In various implementations, a network administrator can observe how a system is managing personal BYOD credentials and instruct the system in the management of personal BYOD credentials using, at least in part, a personal BYOD credential management system API.

The personal BYOD credential management system 110 functions to manage credentials of personal BYODs for accessing a wireless network. In managing credentials associated with various personal BYODs, the personal BYOD credential management system 110 can generate and/or update personal BYOD data indicating personal BYOD credentials for authenticating personal BYODs. Personal BYOD data can include identifications of personal BYODs, unique pre-shared keys associated with personal BYODs, users to whom the personal BYODs belong, and personally created credentials. Personally created credentials include credentials, e.g. user names and passwords, utilized by a user of a personal BYOD in gaining access to a network through the personal BYOD. Depending upon implementation-specific or other considerations, the personal BYOD credential management system 110 can associate and disassociate unique pre-shared keys with personal BYODs. For example, if an employee leaves a company, then the identity platform system 108 can disassociate a unique pre-shared key associated with a personal BYOD of the employee. In various implementations, the personal BYOD credential management system 110 manages credentials of personal BYODs according to input from a network administrator. For example, if a network administrator instructs to ban a personal BYOD of an employee from accessing a network, then the personal BYOD credential management system 110 can disassociate a unique pre-shared key from the personal BYOD that was associated with the personal BYOD.

In a specific implementation, the personal BYOD credential management system 110 manages authentication of personal BYODs for accessing a network. In various implementations, the personal BYOD credential management system 110 can authenticate a personal BYOD for accessing a network using a unique pre-shared key. For example, the personal BYOD credential management system 110 can receive authentication data from a personal BYOD generated using a unique pre-shared key and determine from the authentication data whether it was generated using a unique pre-shared key uniquely associated with the personal BYOD. Further in the example, if the personal BYOD credential management system 110 determines that authentication data was created using a unique pre-shared key associated with the personal BYOD, then the personal BYOD credential management system 110 can allow the personal BYOD to access the network. The personal BYOD credential management system 110 can be implemented as part of a network device or implemented as a cloud based system accessibly by the network device.

In a specific implementation, the personal BYOD credential management system 110 functions to onboard a personal BYOD for accessing a network as part of managing credentials for accessing a wireless network. In onboarding a personal BYOD, the personal BYOD credential management system 110 can assign a unique pre-shared key to the device for authenticating the device for a network. For example, once a personal BYOD attempts to access a network, the personal BYOD credential management system 110 can associate a unique pre-shared key to the device, for use in authenticating the device for the network. Further in the example, the personal BYOD credential management system 110 can send the unique pre-shared key assigned to the device for future use in authenticating the device for the network.

In an example of operation of the example system shown in FIG. 1, the first client device 104 is a corporate-assigned device. In the example of operation of the example system shown in FIG. 1, the client device is a personal BYOD that a user utilizes to create personal credentials used in accessing a network. In the example of operation of the example system shown in FIG. 1, the identify platform system 108 onboards and authenticates the first client device 104 using a unique pre-shared key assigned to the first client device 104. Further, in the example of operation of the example system shown in FIG. 1, the personal BYOD credential management onboards and authenticates the second client device 106 using a unique pre-shared key assigned to the second client device 106. In the example of operation of the example system shown in FIG. 1, the personal BYOD credential management system maintains personal BYOD data indicating personal credentials created by a user of the second client device 106 in accessing a network. Additionally, in the example of operation of the example system shown in FIG. 1, a network administrator can view the personal credentials maintained by the personal BYOD credential management system 110 through, at least in part, a personal BYOD credential management system API integrated as part of the identity platform system 108.

Figure 2:
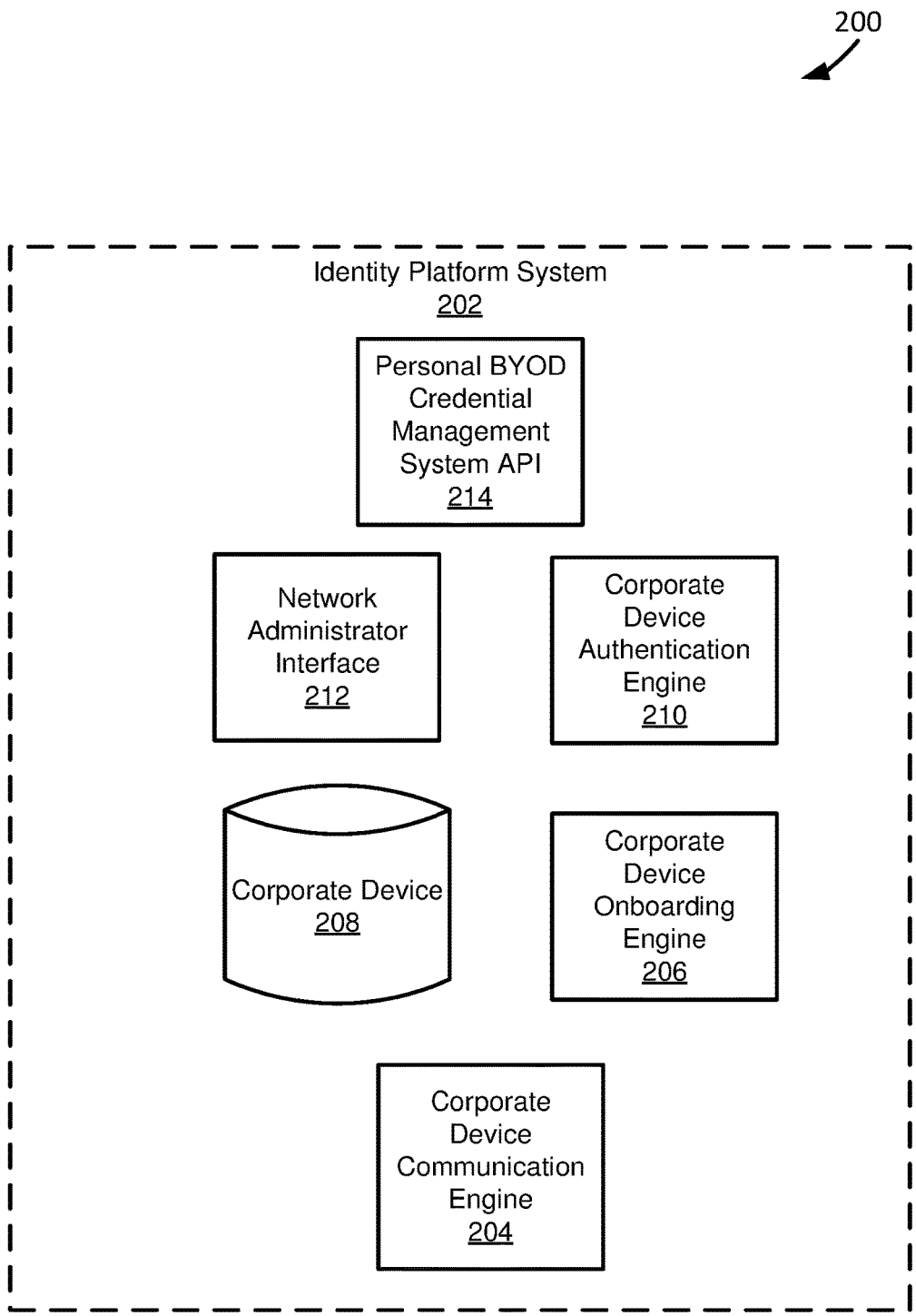
FIG. 2 depicts a diagram of an example of an identity platform system for managing corporate-assigned device credentials and access to a network by corporate-assigned devices.

FIG. 2 depicts a diagram 200 of an example of an identity platform system 202 for managing corporate-assigned device credentials and access to a network by corporate-assigned devices. The identity platform system 202 functions according to an applicable system for managing corporate-assigned device credentials and access to a network by corporate-assigned devices, such as the identity platform systems described in this paper. Depending upon implementation-specific or other considerations, the identity platform system 202 can onboard a corporate-assigned device for accessing a network by assigning a unique pre-shared key to the device for use in authenticating the device for the network. Further depending upon implementation-specific or other considerations, the identity platform system 202 can authenticate a corporate-assigned device for accessing a network based on a unique pre-shared key assigned to the device. In onboarding and authenticating a corporate-assigned devices and managing credentials for corporate-assigned devices, the identity platform system 202 can function as an active directory. In various implementations, the identity platform system include an API that is used to access an applicable system for managing personal BYOD credentials and authentication of personal BYODs, such as the personal BYOD credential management systems described in this paper.

The example identity platform system 202 shown in FIG. 2 includes a corporate device communication engine 204, a corporate device onboarding engine 206, a corporate device datastore 208, a corporate device authentication engine 210, a network administrator interface 212, and a personal BYOD credential management system API 214. The corporate device communication engine 204 functions to send and receive data from a corporate-assigned device. Data transmitted between the corporate device communication engine 204 and a corporate-assigned device can be used in onboarding and authenticating the corporate-assigned device for accessing a network. Depending upon implementation-specific or other considerations, the corporate device communication engine 204 can be used to send a unique pre-shared key to a corporate-assigned device. Further depending upon implementation-specific or other considerations, the corporate device communication engine 204 can receive authentication data from a corporate-assigned device, for use in authenticating the corporate-assigned device for a network. For example, the corporate device communication engine 204 can receive authentication data generated at a corporate-assigned device using a unique pre-shared key associated with the corporate-assigned device.

The corporate device onboarding engine 206 functions to onboard a corporate-assigned device for accessing a network. In onboarding a corporate-assigned device for accessing a network, the corporate device onboarding engine 206 can assign a unique pre-shared key to a corporate-assigned device. Depending upon implementation-specific or other considerations, a unique pre-shared key assigned to a corporate-assigned device can be uniquely associated with only the corporate-assigned device or a plurality of devices including the corporate-assigned device. In assigning a unique pre-shared key to a corporate-assigned device, the corporate device onboarding engine 206 can update corporate device data to indicate that the unique pre-shared key has been assigned to the corporate-assigned device. Depending upon implementation-specific or other considerations, the corporate device onboarding engine 206 can set an expiration time on a unique pre-shared key assigned to a corporate-assigned device. The corporate device onboarding engine 206 can update corporate device data to indicate an expiration time of a unique pre-shared key assigned to a corporate-assigned device.

In a specific implementation, the corporate device onboarding engine 206 functions to assign a new unique pre-shared key or reassign a unique pre-shared key to a corporate-assigned device. Depending upon implementation-specific or other considerations, the corporate device onboarding engine 206 can assign a new unique pre-shared key or reassign a previously assigned unique pre-shared key to a corporate-assigned device in response to an indication that a previously assigned unique pre-shared key has expired. For example, if the corporate device onboarding engine 206 receives an indication that a unique pre-shared key assigned to a specific corporate-assigned device has expired, then the corporate device onboarding engine 206 can assign a new unique pre-shared key. Further depending upon implementation-specific or other considerations, the corporate device onboarding engine 206 can assign a new unique pre-shared key or reassign a previously assigned unique pre-shared key to a corporate-assigned device in response to input received from a network administrator. For example, if a network administrator inputs to assign a new unique pre-shared key to a corporate-assigned device, then the corporate device onboarding engine 206 can assign a new unique pre-shared key to the corporate-assigned device. The corporate device onboarding engine 206 can update corporate device data to indicate a new unique pre-shared key assigned to a corporate-assigned device or a unique pre-shared key reassigned to a corporate-assigned device.

The corporate device datastore 208 functions to store corporate device data. Corporate device data stored in the corporate device datastore 208 can include identifications of corporate-assigned devices, e.g. a MAC address, and unique pre-shared keys assigned to the corporate-assigned devices. Corporate device data stored in the corporate device datastore 208 can include an identification of an employee/user who is associated with or been assigned a corporate assigned device.

In a specific implementation, the corporate device onboarding engine 206 functions to associate a user/employee with a corporate-assigned device. For example, the corporate device onboarding engine 206 can associated an employee to whom a corporate-assigned device is given with the corporate-assigned device. The corporate onboarding engine 206 can update corporate device data to indicate an employee/user associated with a corporate-assigned device. Depending upon implementation-specific or other considerations, the corporate device onboarding engine 206 can query a user of a corporate-assigned device to identify a user of the device. For example, the corporate device onboarding engine 206 can query a user for their user name. Further depending upon implementation-specific or other considerations, the corporate device onboarding engine 206 can identify a user of a corporate-assigned device based on input received from a network administrator. For example, a network administrator can input that a corporate-assigned device has been given to a specific employee, and the corporate device onboarding engine 206 can update corporate device data to indicate that the specific employee is associated with the corporate-assigned device.

In a specific implementation, the corporate device onboarding engine 206 functions to disassociate a corporate-assigned device from a unique pre-shared key associated with the corporate-assigned device. In various implementations, the corporate device onboarding engine 206 can dissociate a corporate-assigned device in response to instructions from a network administrator received through an applicable interface, such as the network administrator interfaces described in this paper. For example, if a network administrator wants to ban a corporate-assigned device from accessing a network, then the network administrator can instruct the corporate device onboarding engine 206 to disassociate the corporate-assigned device from a pre-shared key, and the corporate device onboarding engine 206 can subsequently disassociate the corporate-assigned device from the pre-shared key associated with the corporate-assigned device.

The corporate device authentication engine 210 functions to authenticate a corporate-assigned device for accessing a network. The corporate device authentication engine 210 can authenticate a corporate-assigned device for accessing a network based on a unique pre-shared key assigned to the corporate-assigned device. For example, the corporate device authentication engine 210 can use received authentication data to determine that the authentication data was created from a unique pre-shared key assigned to a corporate-assigned device and subsequently authenticate the corporate-assigned device for accessing a network. In various implementations, the corporate device authentication engine 210 can use corporate device data to authenticate a corporate-assigned device for accessing a network. For example, the corporate device authentication engine 210 can use corporate device data to determine a unique pre-shared key assigned to a corporate-assigned device, and subsequently determine if authentication data received from the corporate-assigned device is created using the unique pre-shared key in determining whether to authenticate the corporate-assigned device.

In a specific implementation, the corporate device authentication engine 210 functions to determine if a corporate-assigned device is using a valid unique pre-shared key. Depending upon implementation-specific or other considerations, the corporate device authentication engine 210 can determine whether a unique pre-shared key is specifically assigned to a device or whether a unique pre-shared key has expired. The corporate device authentication engine 210 can determine whether a unique pre-shared key is specifically assigned to a device or whether a unique pre-shared key has expired using corporate device data. For example, the corporate device authentication engine 210 can determine that a pre-shared key assigned to a corporate-assigned device has expired based on corporate device data. In various implementations, the corporate device authentication engine 210 can instruct an applicable engine for onboarding a corporate-assigned device, such as the corporate device onboarding engines described in this paper, to assign a new unique pre-shared key or reassign a unique pre-shared key to a corporate-assigned device.

The network administrator interface 212 functions to provide an interface through which a network administrator can interact with the identity platform system 202. In interacting with an identity platform system 202 through the network administrator interface 212, a network administrator can manage authentication of corporate-assigned devices for a network. For example, a network administrator can input, through the network administrator interface 212, that a corporate-assigned device has been given to a specific employee. In another example, a network administrator can input, through the network administrator interface 212, that a corporate-assigned device should have its credentials revoked and not be allowed to access a network.

In a specific implementation, the network administrator interface 212 functions to provide an interface through which a network administrator can interact with a system for managing network access for personal BYODs, such as the personal BYOD credential management systems described in this paper. In various implementations, a network administrator can interact with a system for managing network access for personal BYODs using the network interface 212 and an API to the system for managing network access for personal BYODs, such as the personal BYOD credential management system APIs described in this paper. In interacting with a system for managing network access for personal BYODs, a network administrator can control network access for personal BYODs. For example, a network administrator can ban personal BYODs from gaining access to a network. In another example, a network administrator can retrieve personal credentials created by an owner or user of a personal BYOD.

The personal BYOD credential management system API 214 functions to provide access to an applicable system for managing network access for personal BYODs, such as the personal BYOD credential management systems described in this paper. Through the personal BYOD credential management system API 214 an applicable system for managing network access for personal BYODs, such as the personal BYOD credential management systems described in this paper, act as if they are embedded in the identity platform system 202. In various implementations, the personal BYOD credential management system API 214 provides control over personal BYOD network access through the identity platform system 202. For example, the personal BYOD credential management system API 214 can be used to gather personal credentials created by a user of a personal BYOD. In another example, the personal BYOD credential management system API 214 can be used to restrict access for a personal BYOD to a network.

In an example of operation of the example system shown in FIG. 2, the corporate device communication engine 204 functions to transmit and receive data for use in onboarding and authenticating a corporate-assigned device for access to a network. In the example of operation of the example system shown in FIG. 2, the corporate device onboarding engine 206 onboards the corporate-assigned device by assigning a unique pre-shared key to the corporate-assigned device, as indicated by corporate device data stored in the corporate device datastore 208. Further, in the example of operation of the example system shown in FIG. 2, the corporate device authentication engine 210 authenticates the corporate-assigned device by using authentication data received from the corporate-assigned device through the corporate device communication engine 204 and the corporate device data stored in the corporate device datastore 208. In the example of operation of the example system shown in FIG. 2, the personal BYOD credential management system API 214 provides access to an applicable system for managing access to a network for personal BYODs, such as the personal BYOD credential management systems described in this paper. Additionally, in the example of operation of the example system shown in FIG. 2, the network administrator interface 212 provides an interface through which a network administrator can access to an applicable system for managing access to a network for personal BYODs, such as the personal BYOD credential management systems described in this paper using the personal BYOD credential management system API 214.

Figure 3:
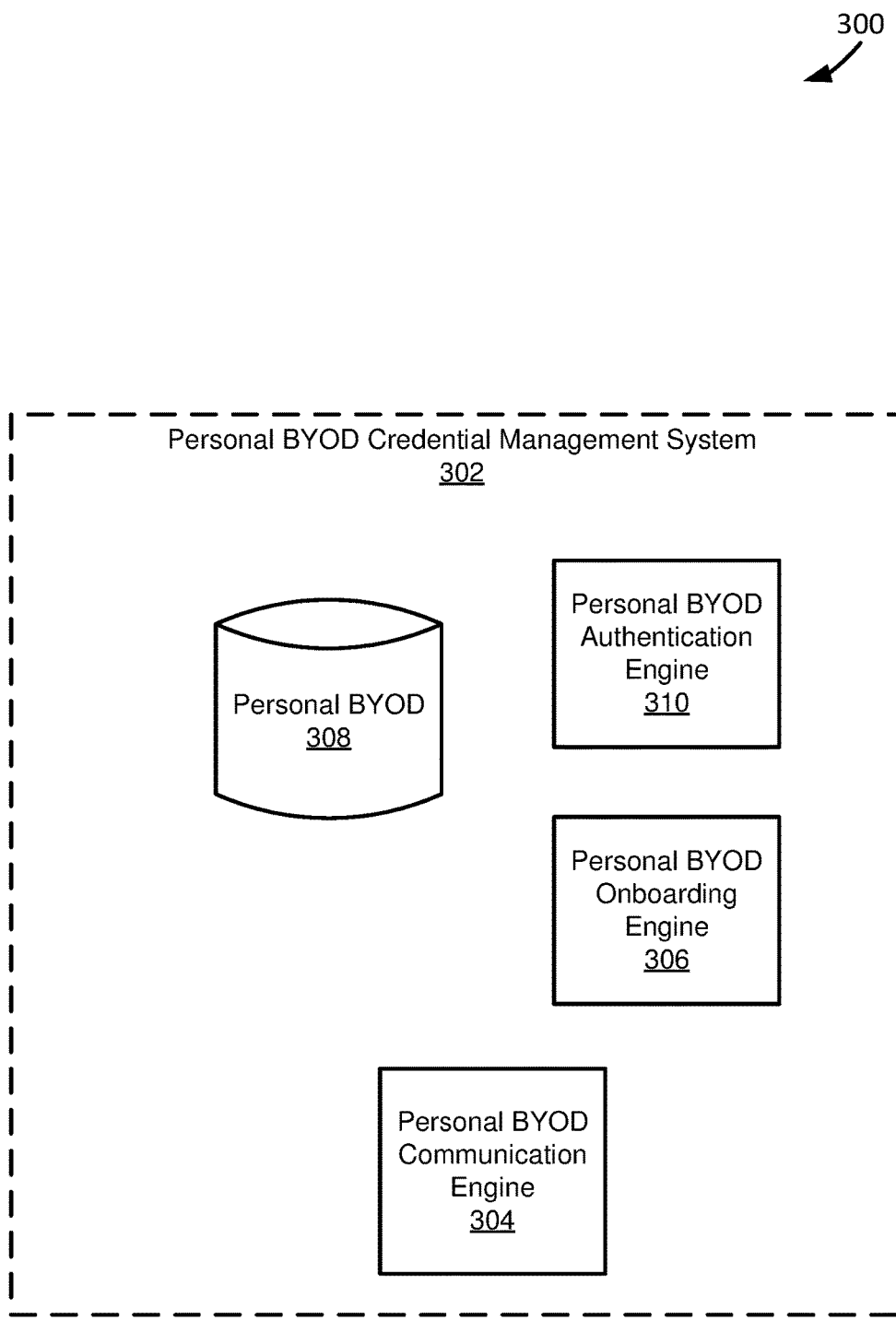
FIG. 3 depicts a diagram of an example of a personal BYOD credential management system for managing personal BYOD credentials and access to a network by personal BYODs.

FIG. 3 depicts a diagram 300 of an example of a personal BYOD credential management system 302 for managing personal BYOD credentials and access to a network by personal BYODs. The personal BYOD credential management system functions according to an applicable system for managing personal BYOD credentials and access to a network by personal BYODs, such as the personal BYOD credential management systems described in this paper. Depending upon implementation-specific or other considerations, the personal BYOD credential management system 302 can onboard a personal BYOD for accessing a network by assigning a unique pre-shared key to the device for use in authenticating the device for the network. Further depending upon implementation-specific or other considerations, the personal BYOD credential management system 302 can authenticate a personal BYOD for accessing a network based on a unique pre-shared key assigned to the device. In various implementations, the personal BYOD credential management system 302 can generate and or update personal BYOD data to indicate personal credentials created by a user of a personal BYOD.

The personal BYOD credential management system 302 shown in the example of FIG. 3 includes a personal BYOD communication engine 304, a personal BYOD onboarding engine 306, a personal BYOD datastore 308, and a personal BYOD authentication engine 310. The personal BYOD communication engine 304 functions to send and receive data from a personal BYOD. Data transmitted between the personal BYOD communication engine 304 and a personal BYOD can be used in onboarding and authenticating the personal BYOD for accessing a network. Depending upon implementation-specific or other considerations, the personal BYOD communication engine 304 can be used to send a unique pre-shared key to a personal BYOD. Further depending upon implementation-specific or other considerations, the personal BYOD communication engine 304 can receive authentication data from a personal BYOD, for use in authenticating the personal BYOD for a network. For example, the personal BYOD communication engine 304 can receive authentication data generated at a personal BYOD using a unique pre-shared key associated with the personal BYOD. Depending upon implementation-specific or other considerations, the personal BYOD communication engine 304 can receive data related to personal credentials created by a user of a personal BYOD and can be used to authenticate a personal BYOD for a network. For example, the personal BYOD communication engine 304 can receive a password and a user name utilized in logging a user of a personal BYOD for authentication of the personal BYOD for a network.

The personal BYOD onboarding engine 306 functions to onboard a personal BYOD for accessing a network. In onboarding a personal BYOD for accessing a network, the personal BYOD onboarding engine 206 can assign a unique pre-shared key to a personal BYOD. Depending upon implementation-specific or other considerations, a unique pre-shared key assigned to a personal BYOD can be uniquely associated with only the personal BYOD or a plurality of devices including the personal BYOD. In assigning a unique pre-shared key to a corporate-assigned device, the personal BYOD onboarding engine 306 can update personal BYOD data to indicate that the unique pre-shared key has been assigned to the personal BYOD. Depending upon implementation-specific or other considerations, the personal BYOD onboarding engine 306 can set an expiration time on a unique pre-shared key assigned to a corporate-assigned device. The personal BYOD onboarding engine 306 can update personal BYOD data to indicate an expiration time of a unique pre-shared key assigned to a personal BYOD device.

In a specific implementation, the personal BYOD onboarding engine 306 functions to assign a new unique pre-shared key or reassign a unique pre-shared key to a personal BYOD. Depending upon implementation-specific or other considerations, the personal BYOD onboarding engine 306 can assign a new unique pre-shared key or reassign a previously assigned unique pre-shared key to a personal BYOD in response to an indication that a previously assigned unique pre-shared key has expired. For example, if the personal BYOD onboarding engine 306 receives an indication that a unique pre-shared key assigned to a specific personal BYOD has expired, then the personal BYOD onboarding engine 306 can assign a new unique pre-shared key. The personal BYOD onboarding engine 306 can update personal BYOD data to indicate a new unique pre-shared key assigned to a personal BYOD or a unique pre-shared key reassigned to a personal BYOD.

Depending upon implementation-specific or other considerations, the personal BYOD onboarding engine 306 can assign a new unique pre-shared key or reassign a previously assigned unique pre-shared key to a personal BYOD in response to input received from a network administrator. For example, if a network administrator inputs to assign a new unique pre-shared key to a personal BYOD, then the personal BYOD onboarding engine 306 can assign a new unique pre-shared key to the personal BYOD. For example, a network administrator can access the personal BYOD credential management system 302 through an applicable API, such as the personal BYOD credential management system APIs described in this paper, and instruct the personal BYOD onboarding engine 306 to assign a new unique pre-shared key to a personal BYOD.

In a specific implementation, the personal BYOD onboarding engine 306 functions to associate a user/employee with a personal BYOD. The personal BYOD engine 306 can update corporate device data to indicate an employee/user associated with a personal BYOD. Depending upon implementation-specific or other considerations, the personal BYOD onboarding engine 306 can query a user of a personal BYOD to identify a user of the device. For example, the personal BYOD onboarding engine 306 can query a user for their user name. Further depending upon implementation-specific or other considerations, the personal BYOD onboarding engine 306 can identify a user of a personal BYOD based on input received from a network administrator.

In a specific implementation, the personal BYOD onboarding engine 306 functions to disassociate a personal BYOD from a unique pre-shared key associated with the personal BYOD. In various implementations, the personal BYOD onboarding engine 306 can dissociate a personal BYOD in response to instructions from a network administrator accessing through an applicable API, such as the personal BYOD credential management system APIs described in this paper. For example, if a network administrator wants to ban a personal BYOD from accessing a network, then the network administrator can instruct the personal BYOD onboarding engine 306 to disassociate the personal BYOD from a pre-shared key, and the personal BYOD onboarding engine 306 can subsequently disassociate the personal BYOD from the pre-shared key associated with the personal BYOD.

The personal BYOD datastore 308 functions to store personal BYOD data. Personal BYOD data stored in the personal BYOD datastore 308 can include identifications of personal BYODs, e.g. a MAC address, and unique pre-shared keys assigned to the personal BYOD. Personal BYOD data stored in the personal BYOD datastore 308 can include an identification of an employee/user that a personal BYOD belongs to or is using. In various implementations, personal BYOD data stored in the personal BYOD datastore 308 includes personal credentials created for a personal BYOD by a user of the personal BYOD. Personal credentials stored in the personal BYOD datastore 308 can be used to authorize a personal BYOD to access a network.

The personal BYOD authentication engine 310 functions to authenticate a personal BYOD for accessing a network. The personal BYOD authentication engine 310 can authenticate a personal BYOD for accessing a network based on a unique pre-shared key assigned to the personal BYOD. For example, the personal BYOD authentication engine 310 can use received authentication data to determine that the authentication data was created from a unique pre-shared key assigned to a personal BYOD and subsequently authenticate the personal BYOD for accessing a network. In various implementations, the personal BYOD authentication engine 310 can use personal BYOD data to authenticate a personal BYOD for accessing a network. For example, the personal BYOD authentication engine 310 can use personal BYOD data to determine a unique pre-shared key assigned to a personal BYOD, and subsequently determine if authentication data received from the personal BYOD is created using the unique pre-shared key in determining whether to authenticate the personal BYOD.

In a specific implementation, the personal BYOD authentication engine 310 functions to determine if a personal BYOD is using a valid unique pre-shared key. Depending upon implementation-specific or other considerations, the personal BYOD authentication engine 310 can determine whether a unique pre-shared key is specifically assigned to a device or whether a unique pre-shared key has expired. The personal BYOD authentication engine 310 can determine whether a unique pre-shared key is specifically assigned to a device or whether a unique pre-shared key has expired using personal BYOD data. For example, the personal BYOD authentication engine 310 can determine that a pre-shared key assigned to a personal BYOD has expired based on personal BYOD data. In various implementations, the personal BYOD authentication engine 310 can instruct an applicable engine for onboarding a personal BYOD, such as the personal BYOD onboarding engines described in this paper, to assign a new unique pre-shared key or reassign a unique pre-shared key to a personal BYOD device. In various implementations, the personal BYOD authentication engine 310 can query a network administrator accessing through an applicable API, such as the personal BYOD credential management system APIs described in this paper, whether to instruct reassignment of a unique pre-shared key to a personal BYOD. For example, the personal BYOD authentication engine 310 can determine that a unique pre-shared key assigned to a personal BYOD has expired, and query a network administrator as to whether to instruct reassignment of the unique pre-shared key or assignment of a new unique pre-shared key to the personal BYOD.

In an example of operation of the example system shown in FIG. 3, the personal BYOD communication engine 304 functions to transmit and receive data for use in onboarding and authenticating a personal BYOD device for access to a network. In the example of operation of the example system shown in FIG. 3, the personal BYOD onboarding engine 306 onboards the personal BYOD device by assigning a unique pre-shared key to the personal BYOD device, as indicated by personal BYOD data stored in the personal BYOD datastore 308. Further, in the example of operation of the example system shown in FIG. 3, the personal BYOD authentication engine 310 authenticates the personal BYOD by using authentication data received from the personal BYOD through the personal BYOD communication engine 304 and the personal BYOD data stored in the personal BYOD datastore 308. In the example of operation of the example system shown in FIG. 3, a network administrator accesses personal BYOD data stored in the personal BYOD datastore 308, including personal credentials created by a user of the personal BYOD, through an applicable API, such as the personal BYOD credential management system APIs described in this paper.

Figure 4:
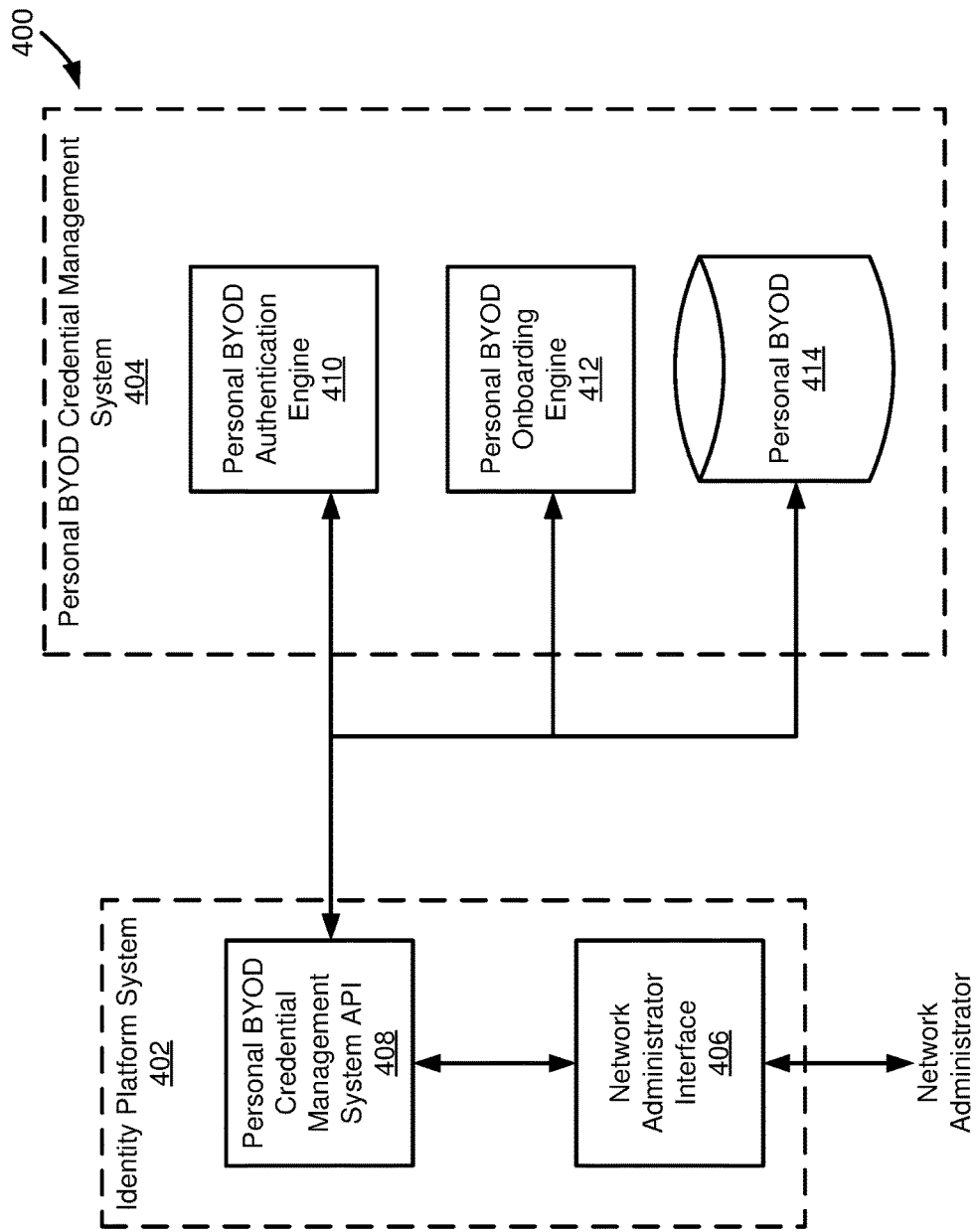
FIG. 4 depicts a diagram of an example of a system through which a network administrator can access a system for managing personal BYOD network access through an active directory.

FIG. 4 depicts a diagram 400 of an example of a system through which a network administrator can access a system for managing personal BYOD network access through an active directory. The example system shown in FIG. 4 includes an identity platform system 402 and a personal BYOD credential management system 404. The identity platform system 402 functions according to an applicable system for managing access to a network for corporate-assigned devices, such as the identity platform systems described in this paper. Depending upon implementation-specific or other considerations, the identity platform system 402 can onboard a corporate-assigned device for accessing a network by assigning a unique pre-shared key to the device for use in authenticating the device for the network. Further depending upon implementation-specific or other considerations, the identity platform system 402 can authenticate a corporate-assigned device for accessing a network based on a unique pre-shared key assigned to the device. In onboarding and authenticating a corporate-assigned devices and managing credentials for corporate-assigned devices, the identity platform system 402 can function as an active directory.

The personal BYOD credential management system 404 functions according to an applicable system for managing access to a network for personal BYODs. Depending upon implementation-specific or other considerations, the personal BYOD credential management system 404 can onboard a personal BYOD for accessing a network by assigning a unique pre-shared key to the device for use in authenticating the device for the network. Further depending upon implementation-specific or other considerations, the personal BYOD credential management system 404 can authenticate a personal BYOD for accessing a network based on a unique pre-shared key assigned to the device. In various implementations, the personal BYOD credential management system 404 can generate and or update personal BYOD data to indicate personal credentials created by a user of a personal BYOD.

In the example system shown in FIG. 4, the identity platform system 402 includes a network administrator interface 406 and a personal BYOD credential management system API 408. Further, in the example system shown in FIG. 4, the personal BYOD credential management system 404 includes a personal BYOD authentication engine 410, a personal BYOD onboarding engine 412, and a personal BYOD datastore 414. The network administrator interface 406 functions according to an applicable interface for allowing a network administrator to interact with the identity platform system 402, such as the network administrator interfaces described in this paper. The personal BYOD credential management system API 408 functions according to an applicable API for allowing access to the personal BYOD credential management system 404, such as the personal BYOD credential management system APIs described in this paper. Through the network administrator interface 406 and the personal BYOD credential management system API 408, a network administrator can access the personal BYOD credential management system 404. For example, personal credentials can be retrieved from the personal BYOD credential management system 404 by the personal BYOD credential management system API 408, and sent to the network administrator through the network administrator interface 406.

The personal BYOD authentication engine 410 functions according to an applicable engine for authenticating personal BYODs for a network, such as the personal BYOD authentication engines described in this paper. The personal BYOD authentication engine 410 can authenticate personal BYODs based on unique pre-shared keys associated with the personal BYODs. Depending upon implementation-specific or other considerations, the personal BYOD authentication engine 410 can authenticate personal BYODs according to instructions sent by a network administrator. Specifically, a network administrator can send instructions through the network administrator interface 406 that are then passed to the personal BYOD authentication engine 410 through the personal BYOD credential management system API 408. For example, a network administrator can send an instruction to the personal BYOD authentication engine 410 to refrain from authorizing a specific personal BYOD for a network. Further depending upon implementation-specific or other considerations, the personal BYOD authentication engine 410 can authenticate personal BYODs by communicating with a network administrator. For example, the personal BYOD authentication engine 410 can query a network administrator by sending a message asking whether to authenticate a personal BYOD to the network administrator interface 406 through the personal BYOD credential management system API 408.

The personal BYOD onboarding engine 412 functions according to an applicable engine for onboarding personal BYODs for a network, such as the personal BYOD onboarding engines described in this paper. The personal BYOD onboarding engine 412 can onboard personal BYODs by associating unique pre-shared keys with the personal BYODs. Depending upon implementation-specific or other considerations, the personal BYOD authentication engine 412 can onboard personal BYODs according to instructions sent by a network administrator. Specifically, a network administrator can send instructions through the network administrator interface 406 that are then passed to the personal BYOD onboarding engine 412 through the personal BYOD credential management system API 408. For example, a network administrator can send an instruction to the personal BYOD onboarding engine 412 to refrain from associating a specific personal BYOD with a unique pre-shared key. Further depending upon implementation-specific or other considerations, the personal BYOD onboarding engine 412 can onboard personal BYODs by communicating with a network administrator. For example, the personal BYOD onboarding engine 412 can query a network administrator by sending a message asking whether to onboard a personal BYOD to the network administrator interface 406 through the personal BYOD credential management system API 408.

The personal BYOD datastore 414 functions according to an applicable datastore for storing personal BYOD data, such as the personal BYOD datastores described in this paper. Personal BYOD data stored in the personal BYOD datastore 414 can include unique pre-shared keys associated with personal BYODs and personal credentials. In various implementations, a network administrator can view and retrieve personal BYOD data stored in the personal BYOD datastore 414. Specifically, the network administrator can access personal BYOD data stored in the personal BYOD datastore 414 using the network administrator interface 406 through the personal BYOD credential management system API 408.

Figure 5:
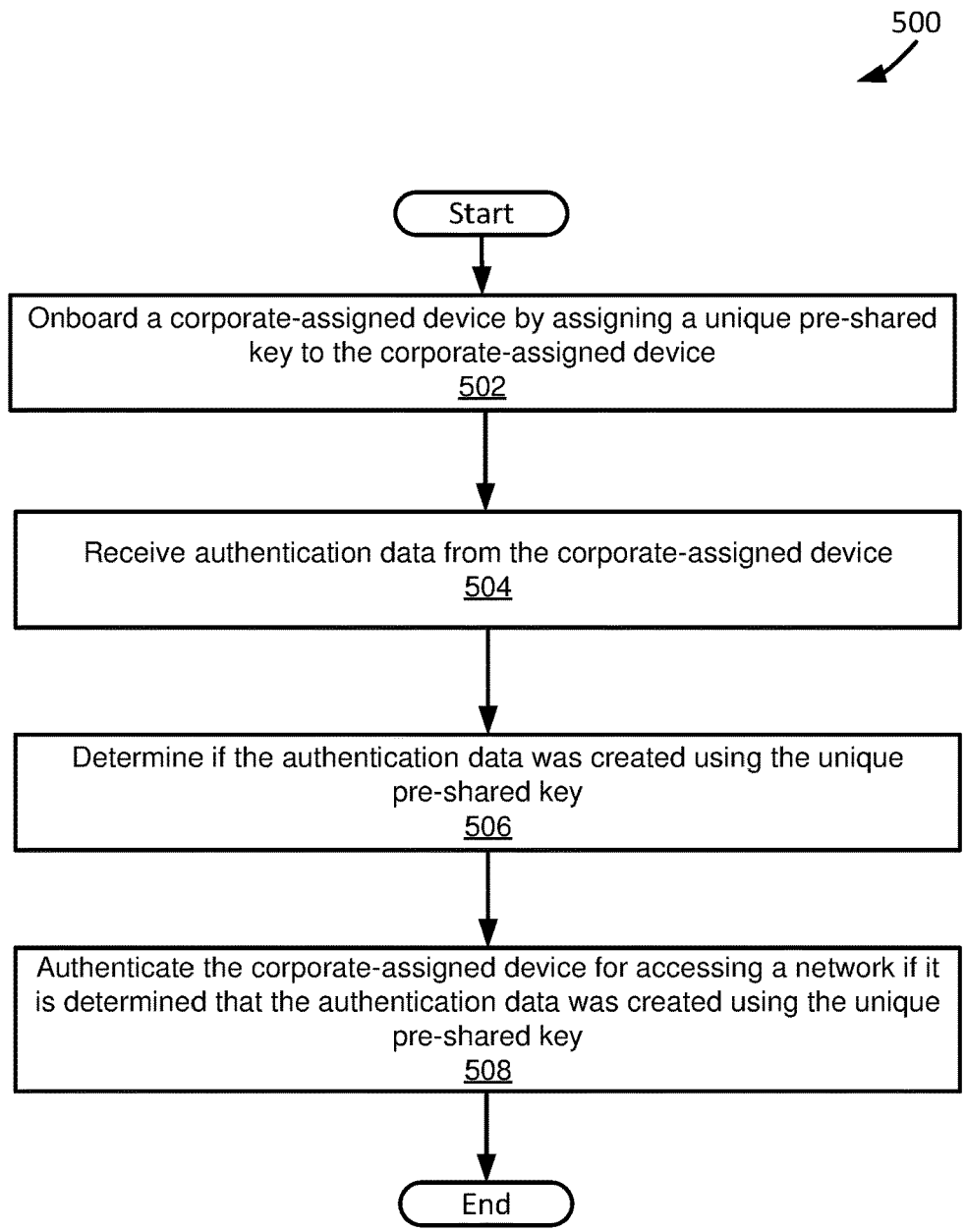
FIG. 5 depicts a flowchart of an example of a method for managing corporate-assigned device access to a network.

FIG. 5 depicts a flowchart 500 of an example of a method for managing corporate-assigned device access to a network. The flowchart 500 begins at module 502, where a corporate-assigned device is onboarded by assigning a unique pre-shared key to the corporate-assigned device. An applicable engine for onboarding a corporate-assigned device, such as the corporate device onboarding engines described in this paper, can onboard a corporate-assigned device by assigning a unique pre-shared key to the corporate-assigned device. A unique pre-shared key assigned to a corporate-assigned device can be sent to the corporate-assigned device. Depending upon implementation-specific or other considerations, a unique pre-shared key assigned to a corporate-assigned device can by unique to the corporate-assigned device or to a plurality of devices, including the corporate-assigned device.

The flowchart 500 continues to module 504, where authentication data is received from the corporate-assigned device. An applicable engine for communicating with the corporate-assigned device, such as the corporate device communication engines described in this paper, can receive authentication data from the corporate-assigned device. Authentication can be received over a wireless connection. In various implementations, authentication data can be created using the unique pre-shared key assigned to the corporate-assigned device.

The flowchart 500 continues to module 506, where it is determined if the authentication data was created using the unique pre-shared key. An applicable authentication engine, such as the corporate device authentication engines described in this paper, can determine if the authentication data was created using the unique pre-shared key. In various implementations, corporate device data can be used to determine if the authentication data was created using the unique pre-share key. For example, corporate device data can be used to determine a unique pre-shared key assigned to a corporate-assigned device, and subsequently determine if authentication data received from the corporate-assigned device is created using the unique pre-shared key in determining whether to authenticate the corporate-assigned device.

The flowchart 500 continues to module 508, where the corporate-assigned device is authenticated for accessing a network if it is determined that the authentication data was created using the unique pre-shared key. An applicable authentication engine, such as the corporate device authentication engines described in this paper, can authenticate the corporate-assigned device for accessing a network if it is determined that the authentication data was created using the unique pre-shared key. In authenticating the corporate-assigned device for a network, the corporate-assigned device can be allowed to access and connect to the network.

Figure 6:
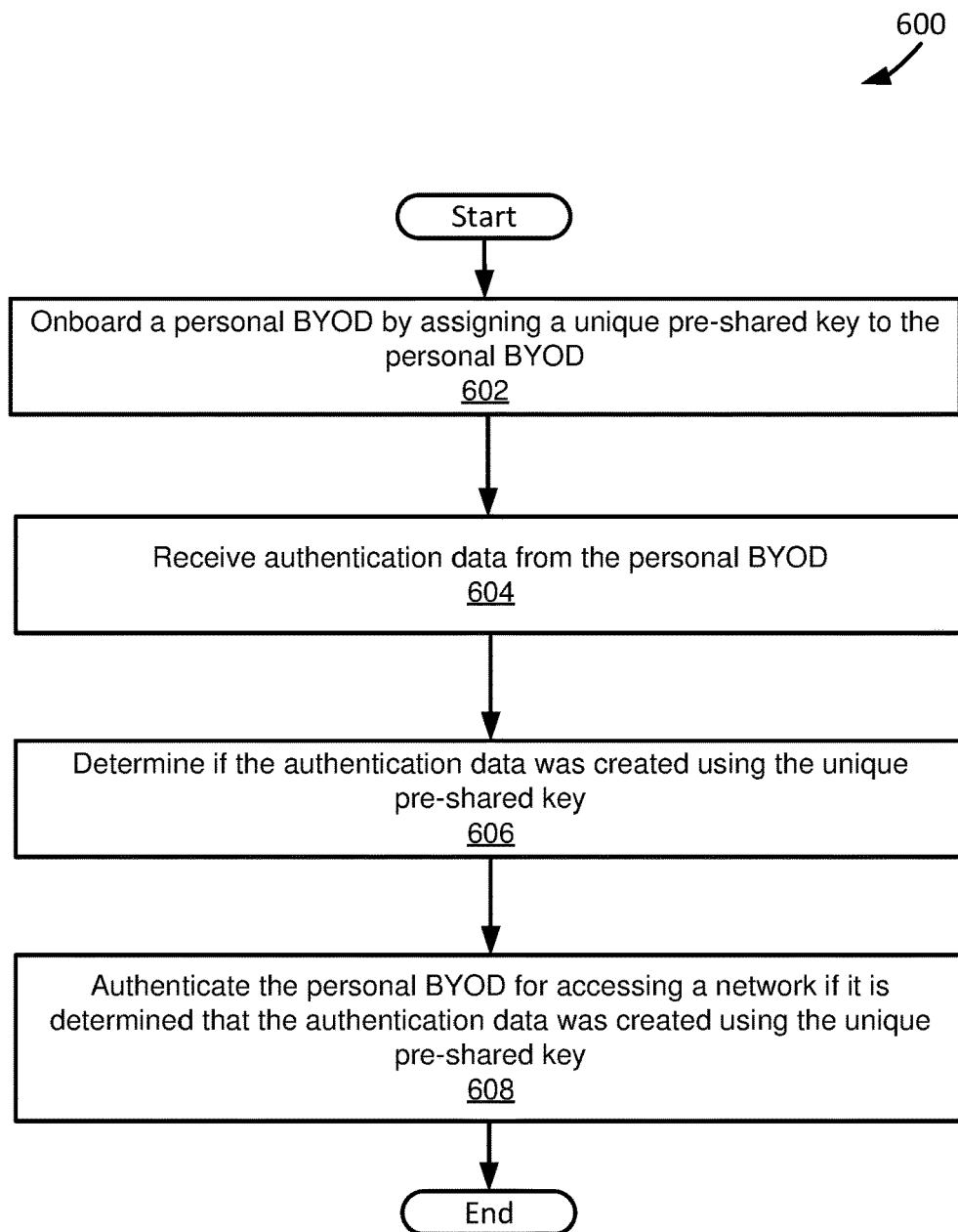
FIG. 6 depicts a flowchart of an example of a method for managing personal BYOD access to a network.

FIG. 6 depicts a flowchart 600 of an example of a method for managing personal BYOD access to a network. The flowchart 600 begins at module 602, where a personal BYOD is onboarded by assigning a unique pre-shared key to the personal BYOD. An applicable engine for onboarding a personal BYOD, such as the personal BYOD onboarding engines described in this paper, can onboard a personal BYOD by assigning a unique pre-shared key to the personal BYOD. A unique pre-shared key assigned to a personal BYOD can be sent to the personal BYOD. Depending upon implementation-specific or other considerations, a unique pre-shared key assigned to a personal BYOD can by unique to the personal BYOD or to a plurality of devices, including the personal BYOD.

The flowchart 600 continues to module 604, where authentication data is received from the personal BYOD. An applicable engine for communicating with the personal BYOD, such as the personal BYOD communication engines described in this paper, can receive authentication data from the personal BYOD. Authentication can be received over a wireless connection. In various implementations, authentication data can be created using the unique pre-shared key assigned to the personal BYOD.

The flowchart 600 continues to module 606, where it is determined if the authentication data was created using the unique pre-shared key. An applicable authentication engine, such as the personal BYOD authentication engines described in this paper, can determine if the authentication data was created using the unique pre-shared key. In various implementations, personal BYOD data can be used to determine if the authentication data was created using the unique pre-share key. For example, personal BYOD data can be used to determine a unique pre-shared key assigned to the personal BYOD device, and subsequently determine if authentication data received from the personal BYOD is created using the unique pre-shared key in determining whether to authenticate the personal BYOD.

The flowchart 600 continues to module 608, where the personal BYOD is authenticated for accessing a network if it is determined that the authentication data was created using the unique pre-shared key. An applicable authentication engine, such as the personal BYOD authentication engines described in this paper, can authenticate the personal BYOD for accessing a network if it is determined that the authentication data was created using the unique pre-shared key. In authenticating the personal BYOD for a network, the personal BYOD can be allowed to access and connect to the network.

Figure 7:
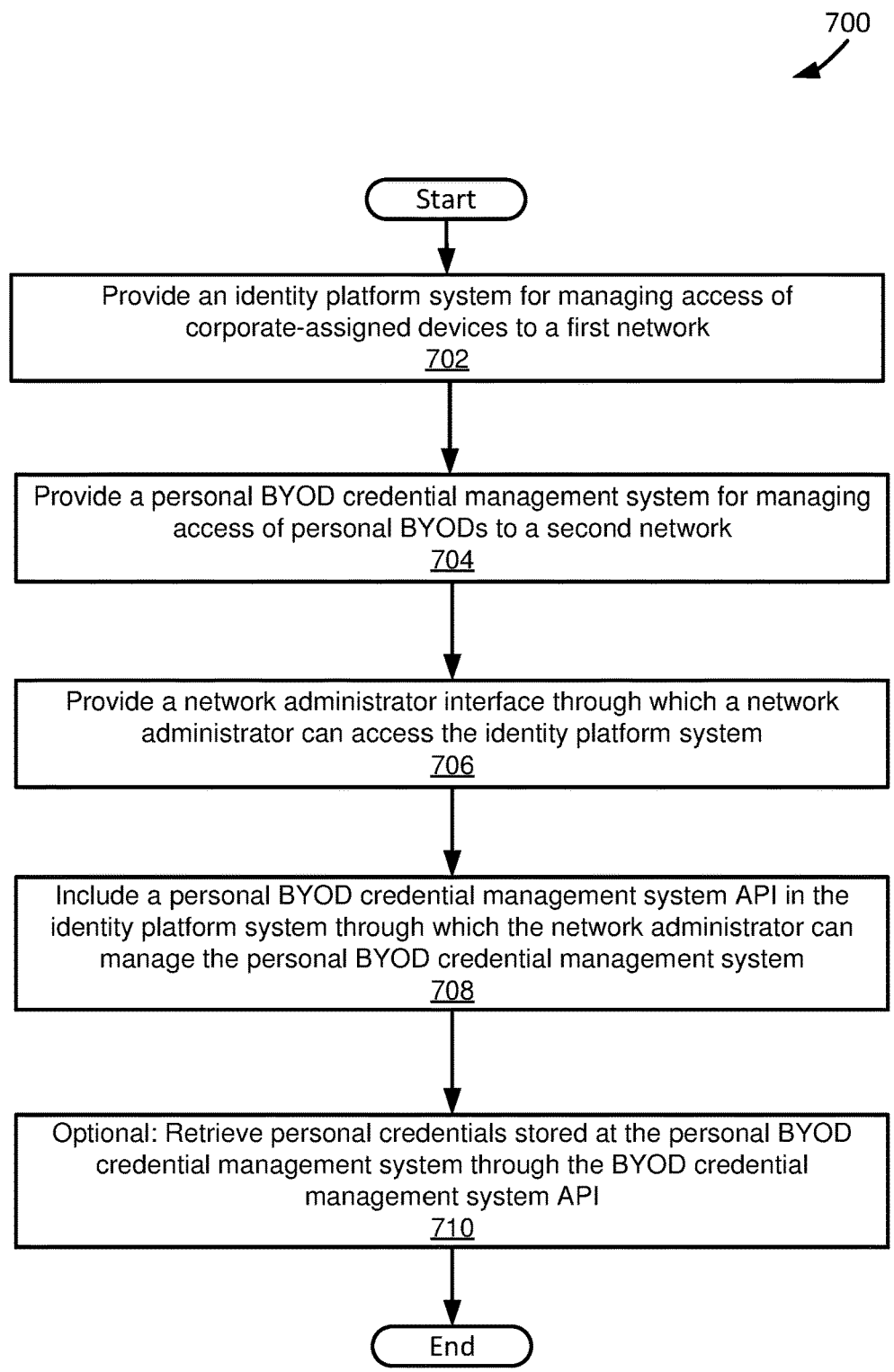
FIG. 7 depicts a flowchart of an example of a method for managing a personal BYOD credential management system through an identity platform system.

FIG. 7 depicts a flowchart 700 of an example of a method for managing a personal BYOD credential management system through an identity platform system. The flowchart 700 begins at module 702, where an identity platform for managing access of corporate-assigned devices to a first network is provided. Depending upon implementation-specific or other considerations, a provided identity platform system can onboard a corporate-assigned device for accessing a network by assigning a unique pre-shared key to the device for use in authenticating the device for a first network. Further depending upon implementation-specific or other considerations, a provided identity platform system can authenticate a corporate-assigned device for accessing a first network based on a unique pre-shared key assigned to the device. In onboarding and authenticating a corporate-assigned devices and managing credentials for corporate-assigned devices, a provided identity platform system can function as an active directory.

The flowchart 700 continues to module 704, where a personal BYOD credential management system for managing access of personal BYODs to a second network is provided. Depending upon implementation-specific or other considerations, the first network and a second network can be the same network or a different network. For example a second network can be a guest network while the first network is an enterprise network. Depending upon implementation-specific or other considerations, a provided personal BYOD credential management system can onboard a personal BYOD for accessing a second network by assigning a unique pre-shared key to the device for use in authenticating the device for the network. Further depending upon implementation-specific or other considerations, a provided personal BYOD credential management system can authenticate a personal BYOD for accessing a second network based on a unique pre-shared key assigned to the device. In various implementations, a provided personal BYOD credential management system can generate and or update personal BYOD data to indicate personal credentials created by a user of a personal BYOD.

The flowchart 700 continues to module 706, where a network administrator interface through which a network administrator can access the identity platform system is provided. In accessing with an identity platform system through a provided network administrator interface, a network administrator can manage authentication of corporate-assigned devices for a network. For example, a network administrator can input, through a provided network administrator interface, that a corporate-assigned device has been given to a specific employee. In another example, a network administrator can input, through a provided network administrator interface, that a corporate-assigned device should have its credentials revoked and not be allowed to access a network.

The flowchart 700 continues to module 708, where a personal BYOD management system API is included in the identity platform system and is used to access the personal BYOD credential system. Through an included personal BYOD management system API, a network administrator can manage the personal BYOD credential management system in providing access of personal BYODs to the second network.

In a specific implementation, in managing the personal BYOD credential management system the network administrator can manage onboarding of personal BYODs through an included personal BYOD management system API. Depending upon implementation-specific or other considerations, personal BYODs can be onboarded according to instructions sent by a network administrator using an included personal BYOD management system API. For example, the network administrator can send an instruction using an included personal BYOD management system API to refrain from associating a specific personal BYOD with a unique pre-shared key. Further depending upon implementation-specific or other considerations, a provided an included personal BYOD management system API can be used to onboard personal BYODs by communicating with the network administrator. For example, a provided an included personal BYOD management system API can be used to query the network administrator by sending a message asking whether to onboard a personal BYOD.

In a specific implementation, in managing the personal BYOD credential management system the network administrator can manage authentication of personal BYODs through an included personal BYOD management system API. Depending upon implementation-specific or other considerations, personal BYODs can be authenticated according to instructions sent by the network administrator using an included personal BYOD management system API. For example, the network administrator can send an instruction to refrain from authorizing a specific personal BYOD for the second network using an included personal BYOD management system API. Further depending upon implementation-specific or other considerations, personal BYODs can be authenticated by communicating with the network administrator using an included personal BYOD management system API. For example, the network administrator can be queried by sending a message asking whether to authenticate a personal BYOD using an included personal BYOD management system API.

The flowchart optionally continues to module 710, where the network administrator retrieves personal credentials stored at the personal BYOD credential management system through the included BYOD credential management system API. Specifically, the network administrator can access personal BYOD data including personal credentials using the network administrator interface through the personal BYOD credential management system API.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:
   providing an identity platform system configured to authenticate a company-assigned device for accessing a first network using a first unique pre-shared key associated with the company-assigned device, a first media access control (MAC) address of the company-assigned device being bound to the first unique pre-shared key to associate the first unique pre-shared key with the company-assigned device, the first network comprising an enterprise network, the company-assigned device being assigned to a user by the company and being owned by the company;
   providing a personal bring your own device (BYOD) credential management system configured to authenticate a personal BYOD for accessing a second network using a second unique pre-shared key associated with the personal BYOD, a second MAC address of the personal BYOD being bound to the second unique pre-shared key to associate the second unique pre-shared key with the personal BYOD, the second network comprising a guest network, the personal BYOD being owned by the user;
   providing a network administrator interface configured to provide access to the identity platform system for a network administrator;
   including a personal BYOD credential management system application program interface (API) as part of the identity platform system and configured to provide the identity platform system access to the personal BYOD credential management system as if the personal BYOD credential management system is embedded in the identity platform system;
   allowing the network administrator to access the identity platform system through the network administrator interface and manage the personal BYOD credential management system through the personal BYOD credential management system API by accessing the identity platform system.

2. The method of claim 1, wherein the first network and the second network are the same network.

3. The method of claim 1, wherein the first network is an enterprise network and the second network is a guest network different from the enterprise network.

4. The method of claim 1, further comprising:
   associating the first unique pre-shared key with the company-assigned device;
   storing corporate device data indicating that the first unique pre-shared key is associated with the company-assigned device;
   receiving authentication data from the company-assigned device;
   authenticating the company-assigned device for the first network.

5. The method of claim 4, further comprising authenticating the company-assigned device for the first network by determining the first unique pre-shared key from the corporate device data and determining whether the authentication data was generated using the first unique pre-shared key.

6. The method of claim 1, further comprising:
   associating the second unique pre-shared key with the personal BYOD;
   storing personal BYOD data indicating that the second unique pre-shared key is associated with the personal BYOD device;
   receiving authentication data from the personal BYOD;
   authenticating the personal BYOD for the second network.

7. The method of claim 6, further comprising authenticating the personal BYOD device for the second network by determining the second unique pre-shared key from the personal BYOD data and determining whether the authentication data was generated using the second unique pre-shared key.

8. The method of claim 1, further comprising allowing the network administrator to manage onboarding of personal BYODs by the personal BYOD credential management system through the personal BYOD credential management system API by accessing the identity platform system.

9. The method of claim 1, further comprising allowing the network administrator to retrieve personal credentials stored at the personal BYOD credential management system through the personal BYOD credential management system API by accessing the identity platform system.

10. A method comprising:
    providing an identity platform system configured to authenticate a company-assigned device for accessing a first network using a first unique pre-shared key associated with the company-assigned device, a first media access control (MAC) address of the company-assigned device being bound to the first unique pre-shared key to associate the first unique pre-shared key with the company-assigned device, the first network comprising an enterprise network, the company-assigned device being assigned to a user by the company and being owned by the company;
    providing a personal bring your own device (BYOD) credential management system configured to authenticate a personal BYOD for accessing a second network using a second unique pre-shared key associated with the personal BYOD, a second MAC address of the personal BYOD being bound to the second unique pre-shared key to associate the second unique pre-shared key with the personal BYOD, the second network comprising a guest network, the personal BYOD being owned by the user;

providing a network administrator interface configured to provide access to the identity platform system for a network administrator;

including a personal BYOD credential management system application program interface (API) as part of the identity platform system and configured to provide the identity platform system access to the personal BYOD credential management system as if the personal BYOD credential management system is embedded in the identity platform system;

allowing the network administrator to access the identity platform system through the network administrator interface and manage the personal BYOD credential management system through the personal BYOD credential management system API by accessing the identity platform system;

associating the first unique pre-shared key with the company-assigned device;

storing corporate device data indicating that the first unique pre-shared key is associated with the company-assigned device;

receiving authentication data from the company-assigned device;

authenticating the company-assigned device for the first network based on the corporate device data and the authentication data received from the company-assigned device.

11. The method of claim 10, wherein the first network and the second network are the same network.

12. The method of claim 10, wherein the first network is an enterprise network and the second network is a guest network different from the enterprise network.

13. The method of claim 10, further comprising:
associating the second unique pre-shared key with the personal BYOD;
storing personal BYOD data indicating that the second unique pre-shared key is associated with the personal BYOD device;
receiving authentication data from the personal BYOD;
authenticating the personal BYOD for the second network based on the personal BYOD data and the authentication data received from the personal BYOD.

14. The method of claim 13, further comprising authenticating the personal BYOD device for the second network by determining the second unique pre-shared key from the personal BYOD data and determining whether the authentication data was generated using the second unique pre-shared key.

15. The method of claim 10, further comprising allowing the network administrator to manage onboarding of personal BYODs by the personal BYOD credential management system through the personal BYOD credential management system API by accessing the identity platform system.

16. The method of claim 10, further comprising allowing the network administrator to retrieve personal credentials stored at the personal BYOD credential management system through the personal BYOD credential management system API by accessing the identity platform system.

17. A method comprising:
providing an identity platform system configured to authenticate a company-assigned device for accessing a first network using a first unique pre-shared key associated with the company-assigned device, a first media access control (MAC) address of the company-assigned device being bound to the first unique pre-shared key to associate the first unique pre-shared key with the company-assigned device, the first network comprising an enterprise network, the company-assigned device being assigned to a user by the company and being owned by the company;

providing a personal bring your own device (BYOD) credential management system configured to authenticate a personal BYOD for accessing a second network using a second unique pre-shared key associated with the personal BYOD, a second MAC address of the personal BYOD being bound to the second unique pre-shared key to associate the second unique pre-shared key with the personal BYOD, the second network comprising a guest network, the personal BYOD being owned by the user;

providing a network administrator interface configured to provide access to the identity platform system for a network administrator;

including a personal BYOD credential management system application program interface (API) as part of the identity platform system and configured to provide the identity platform system access to the personal BYOD credential management system as if the personal BYOD credential management system is embedded in the identity platform system;

allowing the network administrator to access the identity platform system through the network administrator interface and manage the personal BYOD credential management system through the personal BYOD credential management system API by accessing the identity platform system;

associating the second unique pre-shared key with the personal BYOD;

storing personal BYOD data indicating that the second unique pre-shared key is associated with the personal BYOD device;

receiving authentication data from the personal BYOD;

authenticating the personal BYOD for the second network based on the personal BYOD data and the authentication data received from the personal BYOD.

18. The method of claim 17, wherein the first network and the second network are the same network.

19. The method of claim 17, wherein the first network is an enterprise network and the second network is a guest network different from the enterprise network.

20. The method of claim 17, further comprising:
associating the first unique pre-shared key with the company-assigned device;
storing corporate device data indicating that the first unique pre-shared key is associated with the company-assigned device;
receiving authentication data from the company-assigned device;
authenticating the company-assigned device for the first network based on the corporate device data and the authentication data received from the company-assigned device.

21. The method of claim 20, further comprising authenticating the company-assigned device for the first network by determining the first unique pre-shared key from the corporate device data and determining whether the authentication data was generated using the first unique pre-shared key.

22. The method of claim 17, further comprising authenticating the personal BYOD device for the second network by determining the second unique pre-shared key from the personal BYOD data and determining whether the authentication data was generated using the second unique pre-shared key.

23. The method of claim 17, further comprising allowing the network administrator to manage onboarding of personal BYODs by the personal BYOD credential management system through the personal BYOD credential management system API by accessing the identity platform system.

24. The method of claim 17, further comprising allowing the network administrator to retrieve personal credentials stored at the personal BYOD credential management system through the personal BYOD credential management system API by accessing the identity platform system.

* * * * *